Jan. 7, 1964     A. W. ANDERSON     3,116,580
CLOSURE MECHANISM FOR FOOD TRAY COVERS
Filed Dec. 6, 1961     4 Sheets-Sheet 1
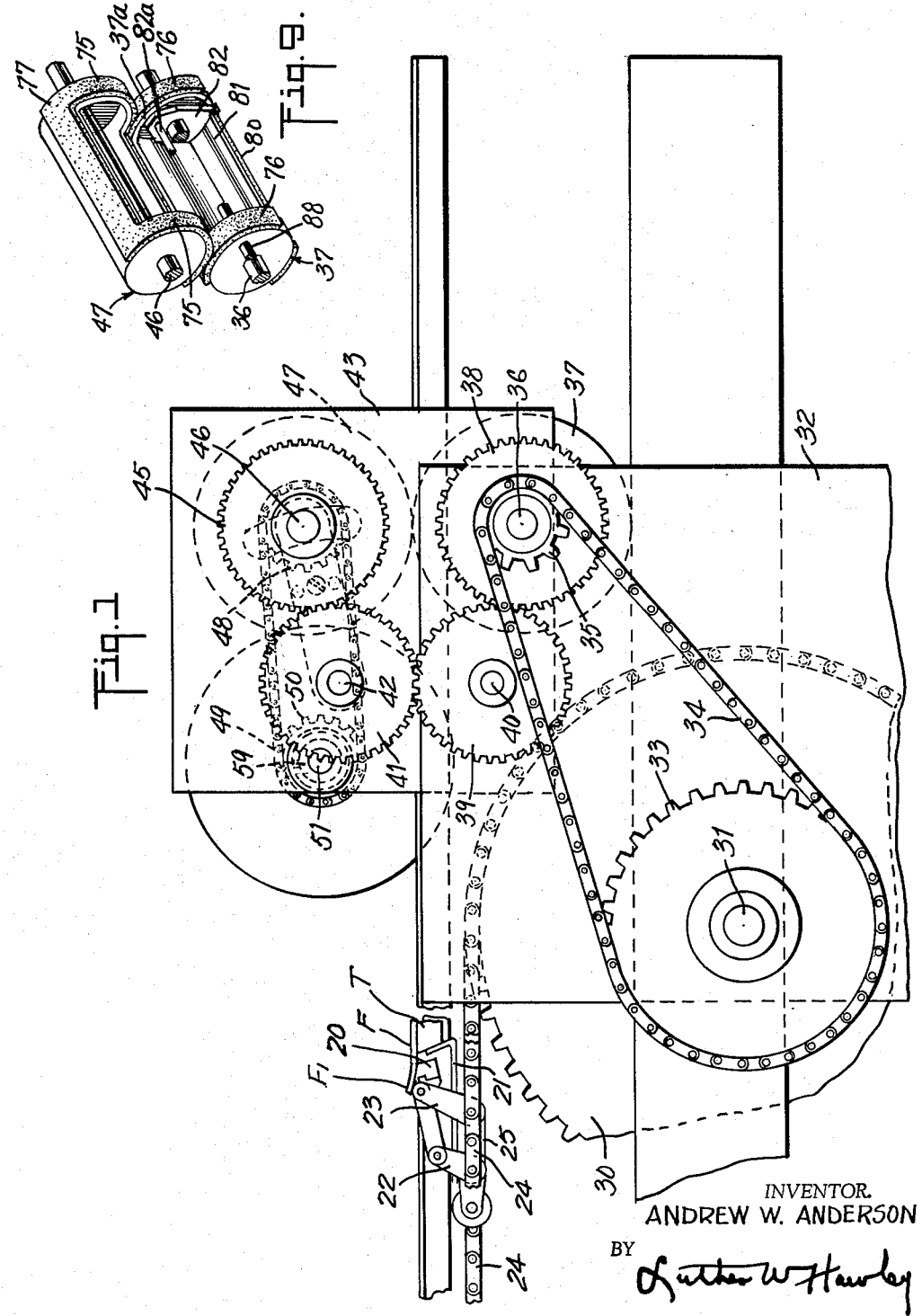
INVENTOR.
ANDREW W. ANDERSON
BY
*ATTORNEY*

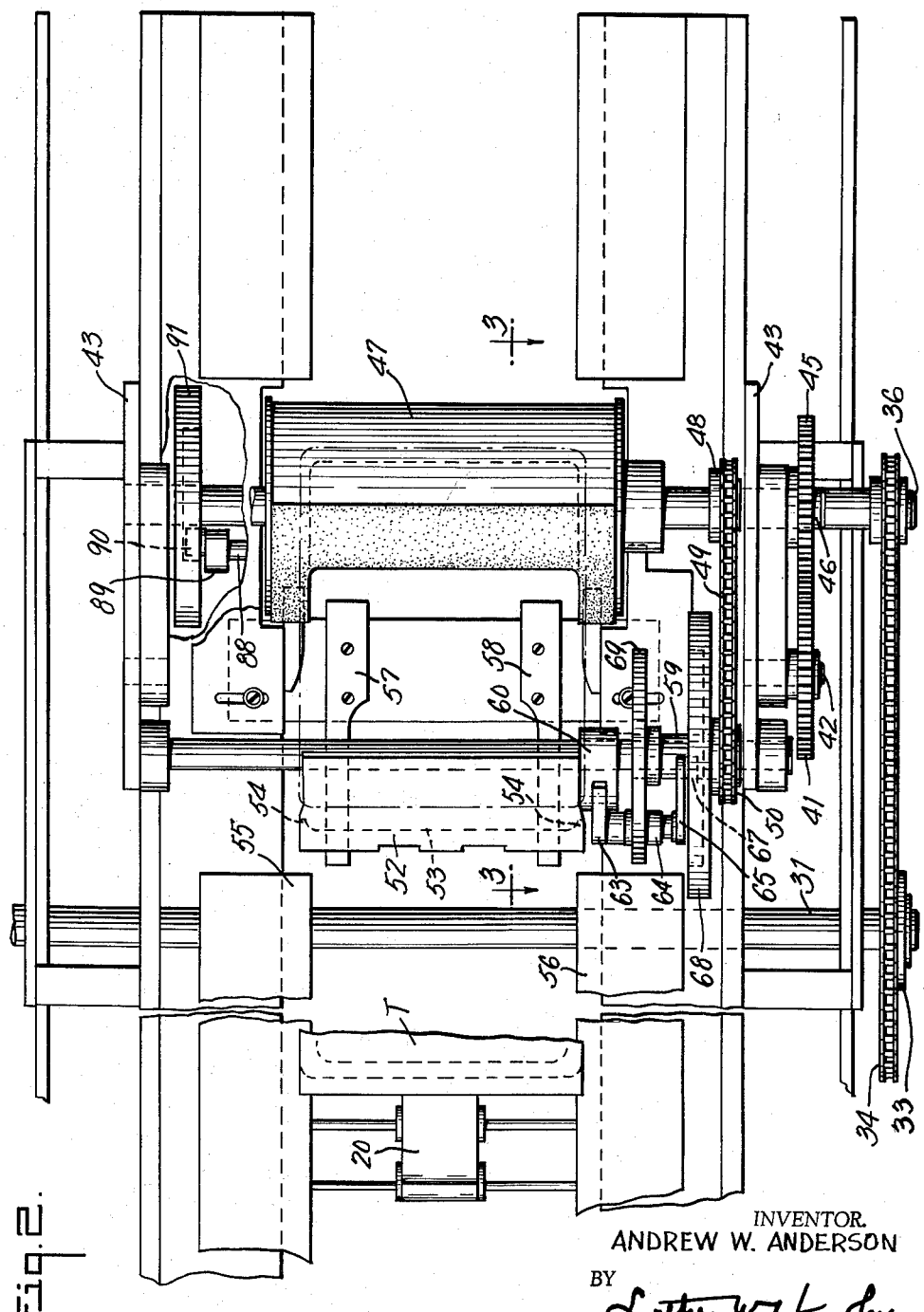

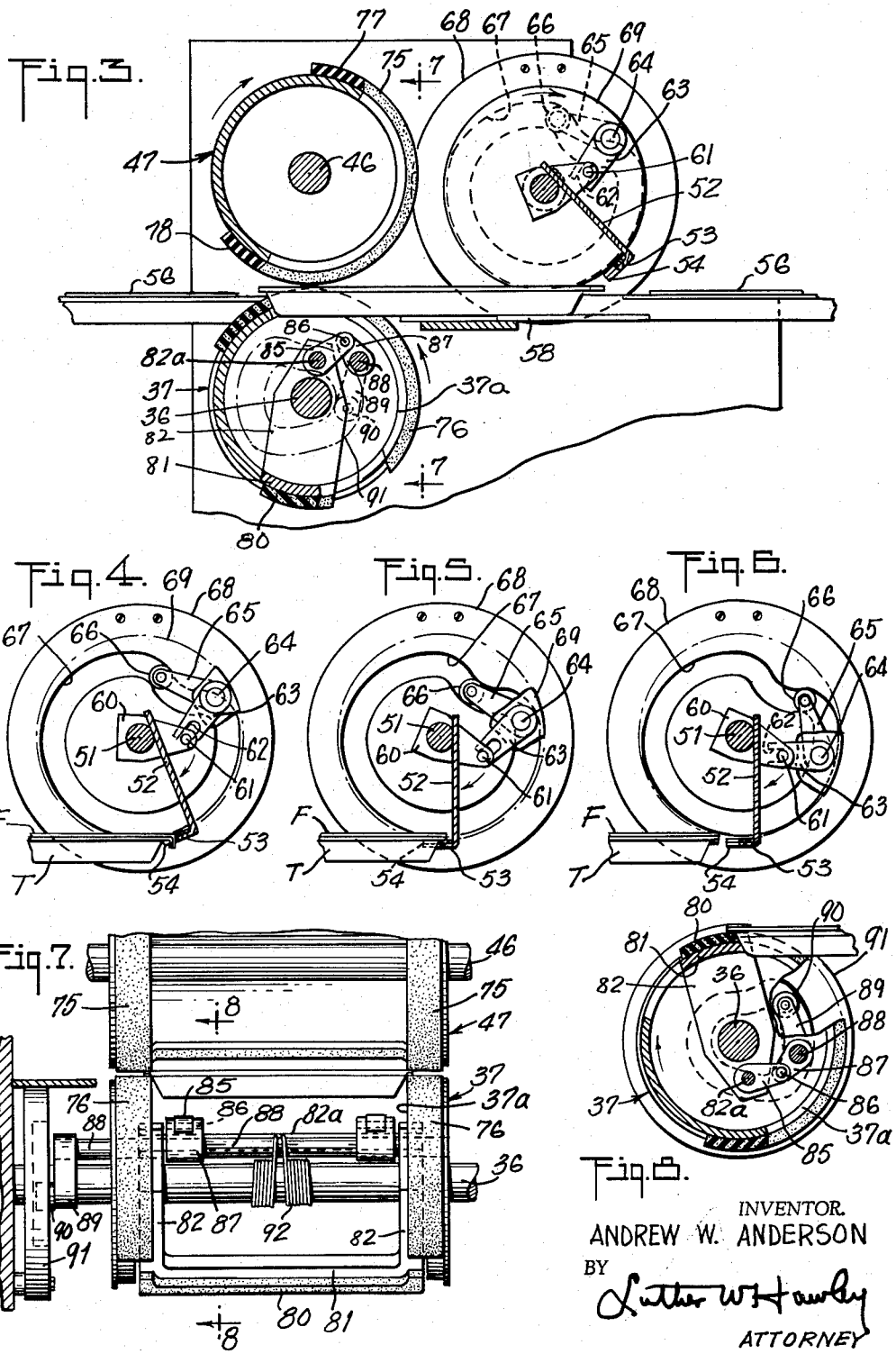

Jan. 7, 1964     A. W. ANDERSON     3,116,580
CLOSURE MECHANISM FOR FOOD TRAY COVERS
Filed Dec. 6, 1961     4 Sheets—Sheet 4

INVENTOR.
ANDREW W. ANDERSON
BY
*Luther W Hawley*
ATTORNEY

United States Patent Office 3,116,580
Patented Jan. 7, 1964

3,116,580
CLOSURE MECHANISM FOR FOOD TRAY COVERS
Andrew W. Anderson, Caldwell, N.J., assignor to Scandia Packaging Machinery Company, North Arlington, N.J., a corporation of New Jersey
Filed Dec. 6, 1961, Ser. No. 157,373
1 Claim. (Cl. 53—329)

This invention relates to closure mechanism for food tray covers.

The invention more particularly stated relates to covers for food trays, such as are known as TV dinners. These trays are filled with food and the filled or loaded trays are covered with a flexible sheet of foil.

The present invention relates to means for folding and crimping the final fold in the trailing edge of the foil sheet.

Applicant's Patent Nos. 2,889,675 and 2,948,096 show machines for covering loaded food trays with foil sheets and the present invention relates to means for folding and crimping the trailing edge of a foil sheet, such as shown in those patents, after the load in the tray has been compressed to a minimum and uniform height.

The invention has for its salient object to provide practical and efficient means for folding and securely crimping the trailing edge of a foil sheet around the trailing edge of a loaded food tray.

Further objects of the invention will appear from the following specification taken in connection with the drawings which form a part of this application, and in which FIG. 1 is a side elevation of mechanism embodying the invention;

FIG. 2 is a top plan view of the structure shown in FIG. 1;

FIG. 3 is a sectional elevation taken substantially on line 3—3 of FIG. 2, looking in the direction of the arrows;

FIGS. 4, 5 and 6 are sectional elevations of the folding mechanism for folding the trailing edge of the foil sheet around the rear edge of the tray, these views showing successive positions of the folding mechanism;

FIG. 7 is an elevational view, partly in section, taken on line 7—7 of FIG. 3, looking in the direction of the arrows;

FIG. 8 is a sectional elevation taken on line 8—8 of FIG. 7, looking in the direction of the arrows, this view, however, showing the crimping mechanism in operative position and not in the position shown in FIGS. 3 and 7;

FIG. 9 is a perspective view of the rollers shown in FIG. 7;

Figure 10:
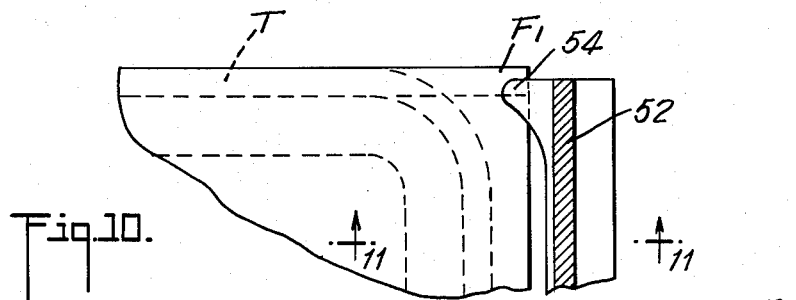
FIG. 10 is a view partly in section and partly in plan showing the folding member for folding the trailing end of the foil sheet underneath the trailing end or rim of the tray.
Figure 11:
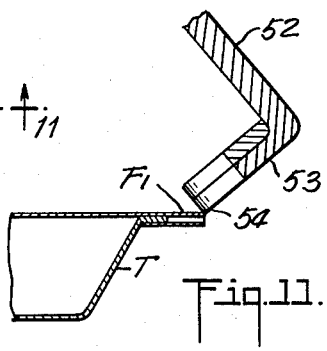
FIG. 11 is a sectional elevation taken substantially on line 11—11 of FIG. 10, looking in the direction of the arrows.

In the embodiment of the invention shown and referring particularly to FIG. 1, a loaded tray T is being pushed by a pusher 20 which extends over the rim at the rear or trailing edge of the tray T. The tray is also pushed by a pusher 21 which engages the tray beneath the rim. The pusher 20 is carried by links 22 and 23 which are mounted on a chain 24, and the pusher 21 is also carried by a block 25 on the chain 24. The chain 24 and the pushers have at this stage pushed the loaded tray through a machine which places the foil sheet F over the load on the tray and which has secured the front edge of the foil sheet beneath the rim at the front of the tray. The trailing edge of the foil sheet extends over the top of the pusher 20.

The chain 24 is driven from a sprocket 30 mounted on a shaft 31 which extends through side frame members 32 and is driven from any suitable source of power.

The shaft 31 also carries a sprocket 33 which drives a chain 34 and this chain drives a sprocket 35 mounted on a shaft 36, on which is also mounted a roller 37.

The shaft 36 has mounted thereon a gear 38 which drives a gear 39 on a shaft 40, and the gear 39 drives a gear 41 on a shaft 42 mounted in a pair of upwardly extending plates 43 secured to the machine frame.

The gear 41 drives a gear 45 mounted on a shaft 46, on which is mounted a roller 47 which coacts with the roller 37 in a manner hereinafter described to feed the trays and to fold and crimp the trailing edge of the foil sheet.

Shaft 46 also has mounted thereon a sprocket wheel 48 which, through a chain 49, drives a sprocket wheel 50 mounted on a bushing 59. The other end of the bushing 59 has secured thereto a disk 69, to which is fixed a stub shaft 64. Shaft 64 has attached thereto arms 63 and 65. The shaft 51 has mounted thereon a plate 52 which has a right angle flange 53 at the end thereof. The flange 53 has extensions 54 at the ends thereof and the folding action of the flange and the ends thereon will be hereinafter described.

As the loaded tray with the foil cover approaches the mechanism by means of which the trailing edge of the foil is folded and crimped beneath the rim at the rear edge of the tray, the tray is supported on ledges 55 and 56. However, the tray leaves the ledges 55 and 56 and is supported on a pair of fingers 57 and 58 and passes beneath the shaft 51 and the folding member 52 and flange 53. At this time in the operation, the plate and flange are moved in the manner shown in FIGS. 3 to 6 inclusive to cause the flange to engage the trailing edge of the foil sheet and to fold the edge beneath the rim at the rear end of the tray. This is accomplished in the following manner.

The plate 52 is carried by the shaft 51 and this shaft has also connected thereto an arm 60 which has a pin 61 positioned in a notch 62 at the end of an arm 63 mounted on a stud shaft 64 which is carried by disk 69. The shaft 64 has also secured thereto an arm 65 and has secured to the outer end thereof a roller 66 positioned in a cam slot 67 formed in a fixed cam block 68. The rotation of disk 69 through the linkage described imparts movement to shaft 51 and plate 52 controlled by the cam 67.

Figure 12:
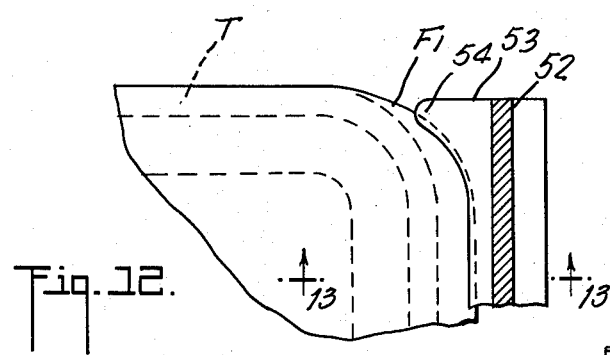
FIG. 12 is a view similar to FIG. 10 but showing the folding member in the position taken when the trailing end of the sheet has been partially folded.
Figure 13:
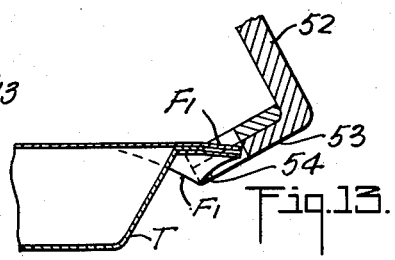
FIG. 13 is a sectional elevation taken substantially on line 13—13 of FIG. 12, looking in the direction of the arrows.
Figure 14:
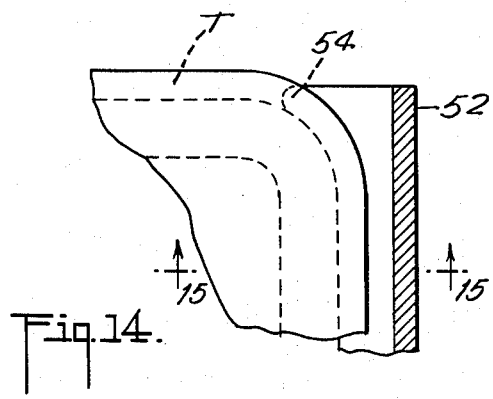
FIG. 14 is a view similar to FIGS. 10 and 12 but showing the folding member in the position taken when the trailing edge of the sheet has been folded under the rim at the rear edge of the tray.
Figure 15:
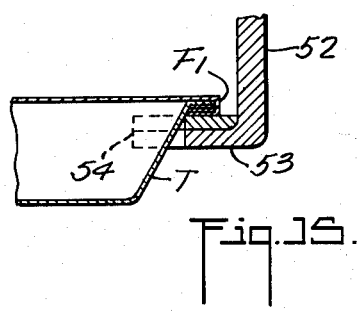
FIG. 15 is a sectional elevation taken substantially on line 15—15 of FIG. 14, looking in the direction of the arrows.

As the shaft 51 is moved in the manner above described, the action of the roller 66 in the cam slot will cause the arm 65 to be oscillated, thus in turn swinging the plate 52 and flange 53 from the position shown in FIG. 3 successively through the positions shown in FIGS. 4, 5 and 6 and also shown in FIGS. 10, 12 and 14, causing the flange 54 to engage the projecting or trailing edge F1 to be successively folded around the rim at the rear edge of the tray and beneath the rim to the position shown in FIGS. 5 and 14.

After the trailing edge of the foil sheet has been thus folded beneath the rear rim of the tray, the tray passes between the rollers 37 and 47. The roller 37 is hollow and has a recessed portion 37a in the periphery thereof which receives the bottom of the tray as the tray is fed between the rollers. The two rollers have bands 75 and 76 at the end portions thereof, as shown in FIG. 7, and these bands grip the laterally projecting rims of the tray therebetween and feed the tray. The bands 75 and 76, as shown in FIG. 3 extend around the peripheries of the rollers approximately for one half of each periphery and at the ends of the bands they are connected by cross strips 77 and 78, of the same material as the bands, that is, resilient or cushioning material.

The means for crimping the folded end of the sheet beneath the rim is illustrated particularly in FIGS. 3 and 8. This means consists of an arcuate strip 80 of cushioning material mounted on an arcuate bar 81 carried by the ends of arms 82 which are pivotally mounted on the shaft 36. The arms 82 have pivoted thereon at 82a, links 85, which are pivoted at 86 to arms 87 on a spindle 88 which is journaled in roller 37 and extends through one end thereof and has secured thereto an arm 89 which carries a roller 90 mounted in the cam slot of a cam 91, the cam being fixed.

As the roller 37 is rotated, the cam 91 will cause the arm 89 to oscillate the arm 87, which in turn will cause the arms 82 to swing from the position shown in FIG. 3 to the position shown in FIG. 8, in which latter position the bar 81 and cushion 80 will engage the folded under end of the trailing end of the foil sheet and press this end firmly against the rear wall of the tray and beneath the rear rim thereof.

The roller 90 and arm 89 are caused to follow the cam 91 by means of a spring 92 which encircles shaft 36 and tends to hold the roller against the outer surface of the cam groove.

The operation of the mechanism above described may be summarized as follows. The trays with the foil cover sheet secured under the front end thereof and trailing in back of the rear end thereof are fed into the mechanism shown in FIG. 1. The trailing edge is first engaged and folded beneath the rear edge or rim of the tray in the manner shown in FIGS. 3, 4 and 5 and FIGS. 10 to 15 inclusive. After this has been accomplished, the folded under end of the foil cover is further engaged and pressed or crimped in the manner shown in FIG. 8.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claim.

What I claim is:

A machine for feeding covered food trays, including:
- (a) means including feed rollers for supporting and feeding a loaded, rimmed food tray having a flexible sheet cover,
- (b) means for engaging and folding the trailing edge of the cover sheet beneath the trailing rim of the tray, and
- (c) means carried by one of the feed rollers and movable relatively thereto subsequently engageable with the folded trailing edge of the cover sheet for crimping the folded edge beneath the rim of the trailing edge of the tray,
- (d) said feeding and supporting means comprising a pair of feed rollers,
- (e) one of the feed rollers having a recess to receive the tray.

References Cited in the file of this patent

UNITED STATES PATENTS

| | | |
|---|---|---|
| 2,886,931 | Karpowicz | May 19, 1959 |
| 2,975,574 | Jorgenson et al. | Mar. 21, 1961 |